United States Patent [19]

Sammells

[11] Patent Number: 4,684,590
[45] Date of Patent: Aug. 4, 1987

[54] SOLVATED ELECTRON LITHIUM ELECTRODE FOR HIGH ENERGY DENSITY BATTERY

[75] Inventor: Anthony F. Sammells, Naperville, Ill.
[73] Assignee: Eltron Research, Inc., Aurora, Ill.
[21] Appl. No.: 902,190
[22] Filed: Aug. 29, 1986
[51] Int. Cl.[4] ............................................. H01M 6/14
[52] U.S. Cl. .................................... 429/194; 429/201; 429/218
[58] Field of Search ....................... 429/194, 196–198, 429/201, 101, 218

[56] References Cited

U.S. PATENT DOCUMENTS 4,049,887  9/1977  Whittingham .................. 429/194 X
4,198,476  4/1980  Di Salvo, Jr. ..................... 429/194
4,233,375  11/1980  Whittingham et al. ............. 429/194
4,243,624  1/1981  Jacobson et al. ............... 429/218 X
4,495,258  1/1985  Mehaute et al. .................... 429/103

Primary Examiner—Anthony Skapars
Attorney, Agent, or Firm—Thomas W. Speckman; Ann W. Speckman

[57] ABSTRACT

A solvated electron lithium electrode comprising a solution of lithium dissolved in liquid ammonia with a lithium intercalating membrane is provided for use in rechargeable high energy density lithium-based cells utilizing a lithium ion conducting liquid non-aqueous electrolyte with a solid positive electrode, or utilizing liquid lithium ion conducting positive electroactive material. The rechargeable lithium-based cell according to the present invention reduces coulombic efficiency losses associated with surface morphological changes at a solid lithium electrode, and is suitable for electrical vehicle propulsion and load leveling applications.

10 Claims, 4 Drawing Figures

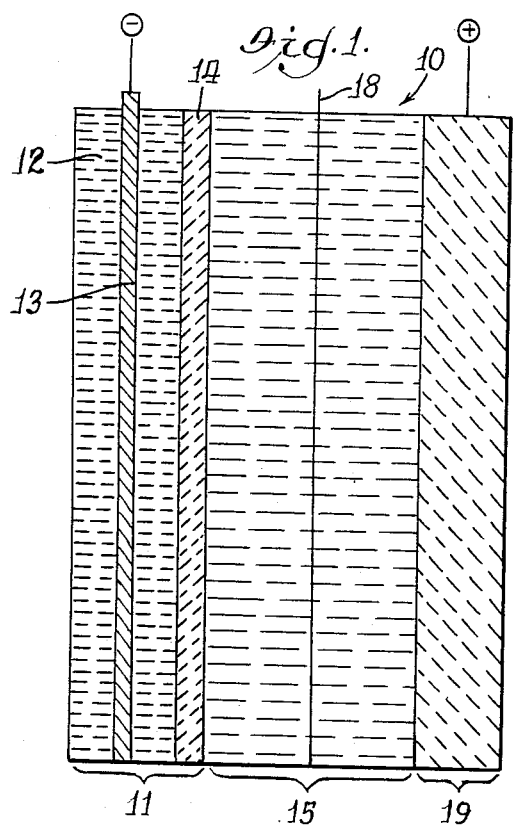
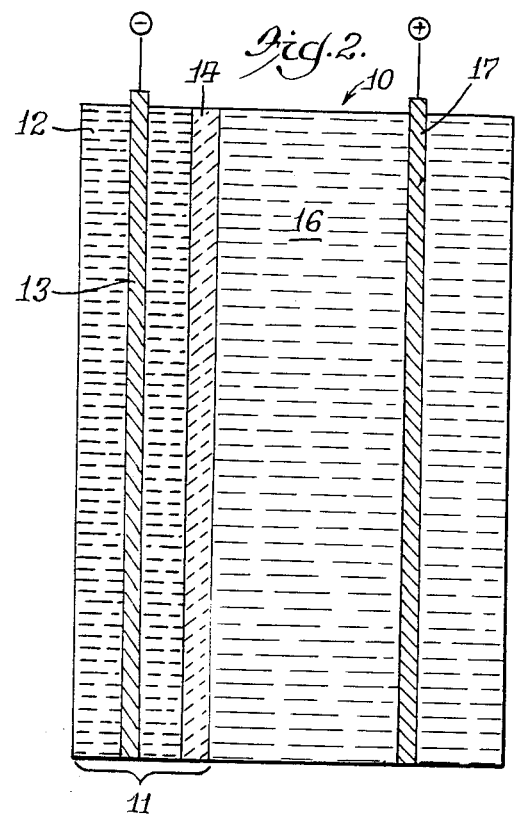
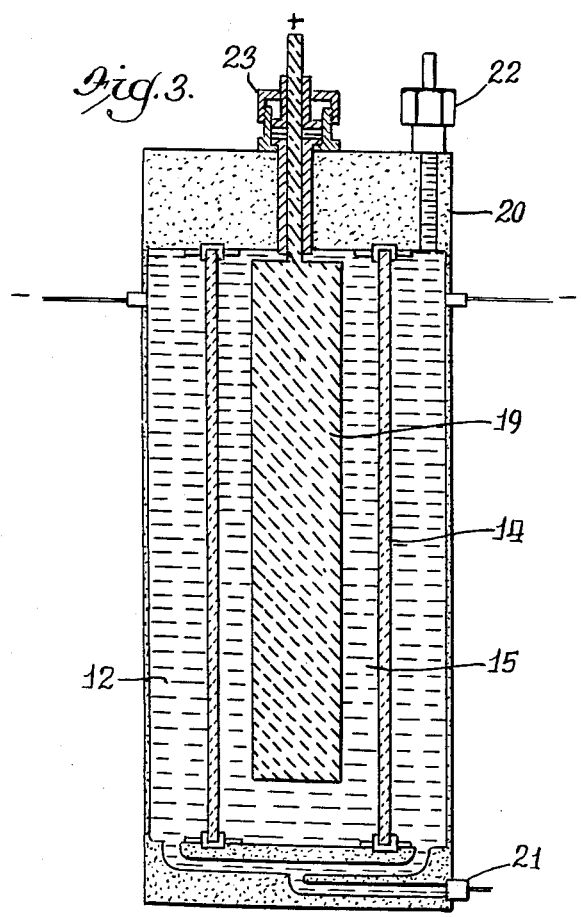
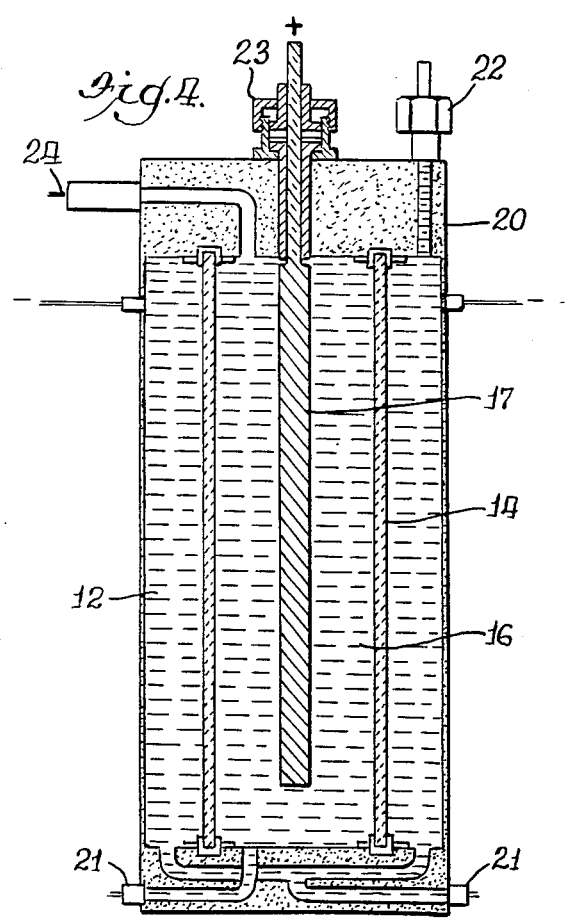

SOLVATED ELECTRON LITHIUM ELECTRODE FOR HIGH ENERGY DENSITY BATTERY

This invention was made as a result of work under NSF-SBIR Contract No. ISI-8560663 awarded by the National Science Foundation. The Government has certain rights in this invention.

BACKGROUND OF THE INVENTION

1. Field of the Invention

The present invention relates to a solvated electron lithium electrode comprising a solution of lithium dissolved in liquid ammonia contained by a lithium intercalating membrane. The solvated electron lithium electrode is suitable for use in a rechargeable high energy density cell or battery utilizing a liquid lithium ion conducting non-aqueous electrolyte and a solid positive electrode, or utilizing liquid lithium ion conducting positive electroactive material.

2. Description of the Prior Art

Secondary cells utilizing essentially pure lithium electrodes as anodes with lithium ion conducting non-aqueous electrolytes generally exhibit less than Faradaic cycling efficiency. Lithium electrodes are prone to undergo surface morphological changes during electrochemical cycling which lower the overall coulombic efficiency of the cell. The reduction in coulombic efficiency represents an irreversible loss in lithium capacity after each cell cycle. During cell charging, electrodeposited lithium reacts with the non-aqueous electrolyte to form an insulating film at the lithium electrode/electrolyte interface. This electrochemically deposited lithium film is non-uniform and dendritic areas develop which become electrically isolated from the lithium negative active material. During subsequent discharge, lithium particles become susceptible to mechanical removal from the electrode without contributing to the overall Faradaic charge capacity of the electrode. Lithium particles lost in this manner are generally unavailable for further cell cycling. This type of irreversible lithium loss due to morphological changes at the lithium electrode/non-aqueous electrolyte interface region occurs when unit activity lithium is deposited during electrode charge.

Electrodes consisting of intercalation compounds for high energy density batteries, and the importance of intercalation electrodes in solid state chemistry is known. See, e.g., M. B. Armand, "Intercalation Electrodes", *Material for Advanced Batteries*, D. W. Murphy, J. Broadhead, eds., Nato Conference Series VI, p. 145 (1979). Intercalation compounds undergo topochemical reactions involving the insertion of a guest into the intercalation compound host lattice structure with minimal structural changes by topotactic electron/ion transfer. Intercalation reactions are generally completely reversible at ambient temperatures and pressures, and therefore utilization of intercalation compounds in secondary cells is very promising.

Lithiated rutiles have been utilized as electrodes in rechargeable electrochemical cells. The topochemical lithiation of rutile related structures in non-aqueous lithium electrochemical cells is taught in D. W. Murphy et al, "Topochemical Reactions of Rutile Related Structures with Lithium", Mat. Res. Bull. Vol. 13, 1395 (1978). This article relates to the use of transition metal chalcogenides, oxides and oxyhalides as host structures suitable for use as cathodes in room temperature batteries utilizing lithium as the guest. Rutile related metal dioxides, in particular, exhibit a range of important parameters for lithium incorporation which suggest their suitability in high energy density battery applications, such as the range of size and vacancy for lithium, diffusion pathway, electronic conductivity, and crystallographic distortion.

One researcher suggests that intercalation of lithium ions may be achieved by reaction of the host lattice with a lithium/ammonia solution to provide an intercalated solid electrode. R. Schollhorn, "Reversible Topotactic Redox Reactions of Solids by Electron/Ion Transfer", Angew. Chem. Int. Ed. Engl. 19: 983 (1980). This article also teaches that much experimental work has been conducted with $Li/TiS_2$ cells having a solid lithium anode and $TiS_2$ layered dichalcogenide cathode. The role of ternary phases in lithium anodes and cathodes comprising metallic halide, oxide and chalcogenide intercalation compounds is elucidated in M.S. Whittingham, "The Role of Ternary Phases in Cathode Reactions", J. Electrochem. Soc.; 123: 315 (1976).

Cells have also been proposed having two intercalation electrodes, each intercalation electrode having a different lithium activity. M. Lazzari and B. Scrosati, "A Cyclable Lithium Organic Electrolyte Cell Based on Two Intercalation Electrodes", J. Electrochem. Soc.; 127:773 (1980).

Solutions of alkali and alkaline earth metals in liquid ammonia are known to exhibit high ionic and electronic conductivity, and utilization of such materials in galvanic cells has been proposed. Dilute solutions of lithium or sodium in ammonia have a characteristic deep blue color, and the solution takes on a bronze or metallic appearance at greater concentrations. According to the solvated electron model, an electron is removed from the alkali or alkaline earth metal and resides in cavities created by the association of several ammonia molecules. The ammoniated electrons are considered to be associated with molecular orbitals located on the ammonia protons.

In general, the technical obstacle to the application of electroactive solvated electron solutions in rechargeable galvanic cells has been the difficulty in providing appropriate containment of the solvated electron solution. Separation of the solvated electron solutions from positive electroactive materials and electrolyte while maintaining low internal resistance is important in high energy density battery applications.

Ambient temperature secondary batteries using a solvated electron electrode comprising sodium or sulfur dissolved in liquid ammonia have been developed. J. Bennett et al, "The Solvated Electron Battery", 18th IECEC Meeting 1665 (1983). Secondary cells containing sodium solvated electron solutions utilizing a sodium ion conducting solid electrolyte, such as $\beta''$-alumina electrolyte, have unacceptably low ionic conductivity at ambient temperatures, and require high operating temperatures. Cells were also developed using a solvated electron sulfur electrode with a sulfinated styrene separator which demonstrated poor containment.

Studies relating to the self-decomposition reaction of concentrated solutions of lithium and ammonia at atmospheric pressure are reported in M. H. Miles and W. S. Harris, "Decomposition Reaction of Concentrated Lithium-Ammonia Solutions", J.Electrochem. Soc., 121: 459 (1974). This publication suggests that solutions of lithium in liquid ammonia could provide an interesting electrochemical fuel for fuel cells or batteries. In the absence of an enclosed vessel, lithium/ammonia solutions slowly decompose by the reaction:

$$Li(NH_3)_x \rightarrow LiNH_2 + (x-1)NH_3(g) + \tfrac{1}{2}H_2(g)$$

as a consequence of the continuous removal of gaseous ammonia and hydrogen. In an enclosed (pressurized) environment, however, this reaction is reversible and decomposition is arrested.

SUMMARY OF THE INVENTION

It is an object of the present invention to provide a solvated electron lithium electrode comprising lithium dissolved in liquid ammonia and a lithium intercalating compound.

It is another object of the present invention to provide a rechargeable high energy density lithium-based cell which demonstrates reduced coulombic efficiency losses associated with surface morphological changes of a solid lithium electrode.

It is another object of the present invention to provide a high energy density secondary cell utilizing a solvated electron lithium negative electrode, liquid non-aqueous lithium ion conducting electrolyte, and a solid positive electrode which achieves high coulombic efficiencies during electrochemical cell cycling.

It is another object of the present invention to provide a high energy density secondary cell utilizing a solvated electron lithium negative electrode and liquid lithium ion conducting positive electroactive material which achieves high coulombic efficiencies during electrochemical cell cycling.

It is yet another object of the present invention to provide lithium-based high power and high energy density secondary batteries which operate under pressure and at substantially ambient temperatures, and are suitable for electrical vehicle propulsion and utility load leveling applications.

The solvated electron lithium negative electrode of the present invention comprises lithium dissolved in liquid ammonia to give a solvated electron solution with a lithium intercalating membrane providing containment of the solvated solution. Lithium is soluble in liquid ammonia solutions at concentrations of about 0.1M to about 7.75M at ambient temperatures. In the context of this disclosure and the appended claims, the terminology "solvated electron solution" includes solutions of lithium in ammonia at concentrations of about 0.1M to about 7.75M and includes bronze solutions. The solvated electron lithium/ammonia solution provides a source of lithium for intercalation into the lithium intercalation membrane for electrochemical cycling in lithium cells.

The high energy density cell of the present invention, in one embodiment, comprises a solvated electron lithium negative electrode and liquid non-aqueous lithium ion conducting electrolyte, with containment of the liquid negative active material from direct contact with the liquid non-aqueous electrolyte provided by the electronically conducting lithium intercalating membrane at the negative electrode. Lithium intercalating compounds suitable for use in the present invention include rutile metal oxides of the general composition $MO_2$, where $M=Mo, Ru, W, Os, Ir,$ and $Mo_{\frac{1}{2}}V_{\frac{1}{2}}$. Tungsten dioxide is an especially preferred intercalation compound which can be readily intercalated with lithium to form a compound having an approximate stoichiometry $Li_xWO_2$, where $0.1 < x < 1.0$. The degree of lithium intercalation will depend upon the state of charge and, therefore, the composition of the Li,NH$_3$ solvated solution. Lithium intercalation of the membrane may be achieved either electrochemically or via direct chemical reaction. Although the non-stoichiometric lithium intercalation compounds exhibit some electronic conductivity, a current collector having high electronic conductivity may, in some cases, be necessary.

Most of the lithium ion conducting liquid non-aqueous electrolytes comprising a lithium ion conducting supporting electrolyte dissolved in a non-aqueous solvent which are utilized with conventional lithium electrodes or lithium intercalation electrodes may be utilized in cells comprising a solvated electron lithium electrode according to the present invention. Suitable solid positive electrodes for use in cells having liquid non-aqueous lithium ion conducting electrolyte such as transition metal chalcogenides, oxides, oxyhalides, and the like, are known to the art.

According to another embodiment of the present invention, the high energy density cell comprises a solvated electron lithium negative electrode and liquid, lithium ion conducting positive active material, with containment of the liquid negative active material from direct contact with the liquid positive electroactive material provided by the electronically conducting lithium intercalating membrane of the negative electrode. Suitable liquid positive electroactive materials comprise liquid positive electrode depolarizing agents such as $SO_2$, $SO_2Cl_2$, and $SOCl_2$, and a lithium ion conducting supporting electrolyte dissolved in a non-aqueous solvent. In a preferred embodiment, the liquid positive electroactive material incorporates a dissolved transition metal halide, such as $CuCl_2$. When liquid positive electroactive materials are used, a current collector is preferably provided in the positive electrode compartment.

According to a preferred embodiment of the present invention, the solvated electron Li,NH$_3$ solution is under pressure in an enclosed negative electrode compartment. Sealing of the solvated Li,NH$_3$ solution from the atmosphere in this fashion prevents decomposition of the solvated Li,NH$_3$ solution and evaporation of liquid ammonia. Pressures of about 3 to about 8 atm during electrochemical cell cycling are preferred in the sealed negative electrode compartment according to this embodiment. Equivalent operating pressures may be applied to the positive electrode compartment during electrochemical cell cycling, but application of equivalent pressure is not necessary in all cases, particularly where solid lithium intercalating positive electrodes are used. Cells according to the present invention comprising a solvated electron lithium electrode may be operated at temperatures of from about $-33°$ C. to about $50°$ C., and are preferably operated at temperatures as close to ambient temperatures as possible.

During discharge at the Li,NH$_3$/Li$_x$WO$_2$ negative electrode, electrochemical oxidation of lithium occurs at the Li$_x$WO$_2$/non-aqueous electrolyte interface region with the chemical activity of intercalated lithium within the Li$_x$WO$_2$ membrane being maintained by its equilibrium with the solvated electron lithium/ammonia solution. During cell charging, the reverse process occurs with electrochemical reduction of Li$^+$ at the Li$_x$WO$_2$/non-aqueous electrolyte interface giving intercalated lithium followed by its eventual dissolution in the solvated electron ammonia solution on the opposite side of the intercalating membrane. The lithium- /ammonia solvated solution acts as a reservoir for lithium storage upon cell cycling, thereby circumventing morphological changes and related capacity losses which occur in conventional lithium non-aqueous battery systems.

The lithium activity of the solvated electron lithium/liquid ammonia solutions utilized in the present invention is always less than unit activity, and the electrochemical potential of lithium in the intercalating membrane ($Li_xWO_2$) is about 0.5 V positive of unit activity lithium. Hence, during cell charge the applied negative overpotential at the lithium intercalating membrane is sufficiently negative to promote lithium intercalation, but sufficiently positive of unit activity lithium to avoid lithium deposition at the intercalating membrane interface with the liquid non-aqueous electrolyte. During charge, the applied potential at the lithium intercalating membrane is sufficiently negative to promote lithium deintercalation and dissolution as a solvated electron lithium species in the lithium/liquid ammonia solution.

Self-discharge of the solvated electron lithium electrode upon open circuit is prevented by the formation of a passivating film at the lithium intercalating membrane interface with the liquid non-aqueous electrolyte or liquid positive electroactive material, similarly to conventional solid lithium electrode cells. The thickness of the passivating layer at the electrode/electrolyte interface is limited, according to the present invention, by the depth of direct chemical reaction which is permitted in the host lattice structure of the intercalating membrane, which is probably limited to several monolayers. The intercalated lithium present at the electrode/electrolyte interface also has much lower activity compared to unit activity lithium cells, thereby reducing the driving force for direct chemical reaction between the lithium electrode and the non-aqueous electrolyte.

Use of the solvated electron secondary lithium electrode comprising a solvated lithium/ammonia solution with a lithium intercalating membrane according to the present invention provides greater versatility in battery geometry, can produce high current densities at ambient temperatures with the solvated electron solution sealed from the atmosphere, and is operable at essentially theoretical coulombic efficiencies.

BRIEF DESCRIPTION OF THE DRAWING

Further features of the invention will be apparent from the following more detailed description taken in conjunction with the following drawings, in which:

FIG. 1 shows a highly schematic sectional view of a cell according to the present invention utilizing a solid positive electrode;

FIG. 2 shows a highly schematic sectional view of a cell according to the present invention utilizing liquid positive electroactive material;

FIG. 3 shows a schematic sectional view of a cell of the present invention having an enclosed cell configuration and utilizing a solid positive electrode; and FIG. 4 shows a schematic sectional view of a cell of the present invention having an enclosed cell configuration and utilizing liquid positive electroactive material.

DESCRIPTION OF PREFERRED EMBODIMENTS

As shown schematically in FIG. 1, high energy density cell 10 comprises negative electrode 11, positive electrode 19, and liquid lithium ion conducting non-aqueous electrolyte 15 disposed between the electrodes and in contact therewith. Negative electrode 11 comprises a solvated electron lithium electrode with solvated lithium/ammonia solution layer 12 preferably provided in an enclosed volume and lithium intercalation membrane 14 containing solvated solution 12. Lithium is present in solvated solution layer 12 at concentrations of about 0.1M to about 7.75M, and preferably at concentrations of about 1.0M to about 3.5M. Current collector 13 may be arranged in solvated solution layer 12 but provision of a current collector is not required for all applications, since solvated lithium/ammonia solution 12 is an excellent electronic conductor. Current collector 13 preferably comprises a mixture of tungsten dioxide and carbon sintered and pressed to provide a layer of uniform porosity and thickness. Suitable thicknesses for current collector 13 are generally from about 0.1 mm to about 1.0 cm, depending upon the overall cell geometry and configuration. Current collection may also be achieved by attachment of a nichrome wire, or the like, to lithium intercalation membrane 14.

Suitable lithium intercalating compounds for use in this invention include but are not limited to rutiles having the general formula $MO_2$, where M=Mo, Ru, W, Os, Ir and $Mo_{\frac{1}{2}}V_{\frac{1}{2}}$. Crystallographic parameters for suitable rutile metal oxides in both the lithiated and unlithiated condition are as follows:

TABLE I

Crystallographic Parameters of Interest for Selected Rutiles and Lithiated Rutiles

|  | a(Å) | C(Å) | c/a | V(Å)$^3$ | ΔV/v | Decomposition Temperature (°C.) |
|---|---|---|---|---|---|---|
| $MoO_2$ | 4.82 | 2.80 | 0.581 | 65.05 | | |
| $Li_{1.0}MoO_2$ | 5.13 | 2.78 | 0.542 | 73.16 | 0.125 | 210 |
| $RuO_2$ | 4.491 | 3.106 | 0.692 | 62.64 | | |
| $Li_{1.3}RuO_2$ | 5.043 | 2.784 | 0.552 | 70.80 | 0.130 | 210 |
| $WO_2(c)$ | 4.88 | 2.78 | 0.570 | 66.20 | | |
| $Li_{1.0}WO_2$ | 5.16 | 2.75 | 0.533 | 73.22 | 0.106 | 80 |
| $OsO_2$ | 4.497 | 3.182 | 0.708 | 64.36 | | |
| $Li_{1.5}OsO_2$ | 5.162 | 2.795 | 0.541 | 74.45 | 0.157 | |
| $IrO_2$ | 4.499 | 3.155 | 0.701 | 63.85 | | |
| $Li_{1.5}IrO_2$ | 4.873 | 3.190 | 0.655 | 75.75 | 0.186 | >80 |
| $Mo_{\frac{1}{2}}V_{\frac{1}{2}}O_2$ | 4.64 | 2.86 | 0.616 | 61.66 | | |
| $Li_{1.0}Mo_{\frac{1}{2}}V_{\frac{1}{2}}O_2$ | 5.06 | 2.79 | 0.551 | 71.43 | 0.158 | 130 |

Other lithium intercalating compounds with similar crystallographic parameters may also be adapted for use in the present invention. Tungsten dioxide ($WO_2$) is especially preferred for use as intercalating membrane 14, since it is readily electrochemically intercalated to a lithiated compound having stoichiometries from about $Li_{0.1}WO_2$ to about $Li_{0.9}WO_2$. Tungsten dioxide intercalates at a potential of approximately 0.5 V positive of lithium, and is electrochemically reversible to lithium intercalation. Suitable thicknesses for intercalating membrane 14 are generally from about 0.1 mm to about 4.0 mm, and preferably from about 1.0 mm to about 3.5 mm, depending upon the overall cell configuration.

Liquid non-aqueous lithium ion conducting electrolyte 15 is provided in the embodiment shown in FIG. 1 contacting lithium intercalation membrane 14 and positive electrode 19. Non-aqueous lithium ion conducting electrolyte 15 may be separated into two chambers by means of porous separator or spacer 18. Provision of a separator is not, however, required for most applications. Suitable separators, such as ultra-fine porous polyethylene separators, are known to the art. Suitable liquid non-aqueous lithium ion conducting electrolytes comprising a lithium ion conducting supporting electrolyte dissolved in a non-aqueous solvent are known to the art, and are currently used in cells comprising solid lithium electrodes and lithium intercalation electrodes. Suitable non-aqueous solvents comprising non-aqueous lithium ion conducting electrolyte 15 may include tetrahydrofuran and its derivatives; propylene carbonate; acetonitrile; 1,3 dioxalane N-methyl-2-pyrrolidone; sulpholane; methylformate; dimethyl sulfate; γ-butyrolactone; 1,2-dimethoxyethane; and other solvents which are known to the art which exhibit similar properties. Suitable supporting electrolytes comprising non-aqueous lithium ion conducting electrolyte 15 in combination with a suitable solvent may include $LiCF_3SO_3$; $LiAsF_6$; $LiClO_4$; $LiAlCl_4$; $LiGaCl_4$; $LiBF_4$; $LiCl$; and other supporting electrolytes which are known to the art which exhibit similar properties.

Suitable solid positive electrodes 19, according to the embodiment shown in FIG. 1, may comprise $TiS_2$; $ZrS_2$; $ZrSe_2$; $VSe_2$; $V_2S_5$; $Fe_{0.25}V_{0.75}S_2$; $Cr_{0.75}V_{0.25}S_2$; $Cr_{0.5}V_{0.5}S_2$; $NbS_3$; $NiPS_3$; $FeOCl$; $UO_2F_2$; $NbSe_3$; $MoS_3$; $CuS$; $Cr_3O_8$; $V_6O_{13}$ (stoichiometric); $V_6O_{13}$ (non-stoichiometric); $TaS_2$; $MoS_2$; $MoSe_2$; $WS_2$; $WSe_2$; and the like. Positive electrodes 19 comprising $TiS_2$ are especially preferred. $TiS_2$ positive electrodes may also comprise a Teflon/graphite/$TiS_2$ mixture. Current collection is preferably achieved using a nichrome wire, or the like.

One especially preferred cell configuration according to this embodiment is provided with a solvated electron lithium electrode comprising lithium dissolved in liquid ammonia and a lithium intercalated $Li_xWO_2$ ceramic membrane with liquid non-aqueous lithium ion conducting electrolyte comprising propylene carbonate solvent with $LiCF_3SO_3$ supporting electrolyte and a solid lithium intercalating $TiS_2$ positive electrode.

According to another embodiment of the present invention shown schematically in FIG. 2, liquid positive electroactive material 16 is providing contact to lithium intercalating membrane 14. This embodiment utilizes a solvated electron lithium negative electrode in combination with liquid positive electroactive material. Suitable positive electroactive materials comprise a liquid depolarizing agent such as $SO_2$, $SO_2Cl$ or $SOCl_2$ and a lithium ion conducting supporting electrolyte dissolved in a non-aqueous solvent. In a preferred embodiment, liquid positive electroactive material 16 incorporates a dissolved transition metal halide, such as $CuCl_2$. Current collector 17 is preferably provided in liquid positive electroactive material 16. Suitable current collectors 17 are known to the art and may comprise graphitized carbon, for example. One especially preferred cell configuration according to this embodiment is provided with a solvated electron lithium electrode comprising lithium dissolved in liquid ammonia and a lithium intercalated $Li_xWO_2$ ceramic membrane with positive electroactive material comprising liquid depolarizing agent $SO_2$ with dissolved $CuCl_2$, supporting electrolyte $LiCF_3SO_3$ dissolved in acetonitrile solvent, and a graphitized carbon current collector.

High energy density cell 10 according to the present invention may be conformed to a variety of battery geometries, such as prismatic, filter press, tubular and circular, which are known to the art. FIGS. 3 and 4 illustrate embodiments of the present invention having an enclosed cell configuration. FIG. 3 illustrates a cell of the type shown in FIG. 1 utilizing a solid positive electrode, and FIG. 4 illustrates a cell of the type shown in FIG. 2 utilizing liquid positive electroactive material. Cell housing 20 is provided as a closed container and comprises a material which is electronically conductive and provides current collection from the negative electrodes. Stainless steel is a preferred material for cell housing 20. Solvated electron $Li,NH_3$ solution 12 is provided in the space between cell housing 20 and lithium intercalating membrane 14, preferably comprising $Li_xWO_2$. In the embodiment of FIG. 3, non-aqueous lithium conducting electrolyte 15 is provided in the enclosed space between lithium intercalating membrane 14 and solid positive electrode 19. In the embodiment of FIG. 4, liquid positive electroactive material 16 is provided in the enclosed space formed by lithium intercalating membrane 14, and preferably comprises a liquid depolarizing agent, a dissolved transition metal halide and a lithium ion conducting supporting electrolyte dissolved in non-aqueous solvent. Current collector 17 is preferably provided to collect current from liquid positive electroactive material 16. Liquid ammonia inlet 21, vent 22 serving as an ammonia vent and a lithium addition port, and positive electrode feed through means 23 providing a seal from the atmosphere, are shown in both embodiments. Liquid depolarizing agent inlet 25 and liquid depolarizing agent vent 24 are provided in the embodiment of FIG. 4. Suitable and preferred components for the embodiments shown in FIGS. 3 and 4 are disclosed in the description of FIGS. 1 and 2. Cells of the type shown in FIGS. 3 and 4 may also be arranged in a positive grounded arrangement with a central negative electrode, although negative-grounded cells, as shown in FIGS. 3 and 4 are generally less susceptible to corrosion and are, therefore, preferred. The enclosed volume cell configurations shown in FIGS. 3 and 4 are just one example of a preferred cell geometry for the cells of the present invention.

In a preferred embodiment of the present invention, the solvated electron lithium negative electrode is provided in a sealed negative electrode compartment. During electrochemical cell cycling, pressures of about 3 to 8 atm are preferably generated in the negative electrode compartment. Equivalent operating pressures may be applied to the positive electrode compartment. Operating temperatures during pressurized cell cycling may range from about −33° C. to about 50° C. and are preferably close to ambient temperatures.

A plurality of cells may be assembled to provide a lithium-based high power and energy density rechargeable battery for applications such as electric vehicle propulsion and utility load leveling. Suitable cell containers, such as Teflon polyethylene and other insulating materials are known to the art. The cell container may, in some embodiments, require reinforcement to withstand pressure. Cells according to the present invention can be electrochemically cycled at current densities up to about 100mA/cm².

The following examples set forth specific cell components and their methods of manufacture and specific cell configurations, for the purpose of more fully understanding preferred embodiments of the present invention and are not intended to limit the invention in any way.

EXAMPLE I

A cell of the type shown in FIG. 1 was assembled comprising a solvated electron lithium electrode with a tungsten dioxide lithium intercalation membrane, a liquid lithium ion conducting non-aqueous electrolyte and a lithium intercalation positive electrode. The solvated electron lithium solution was prepared by initially introducing lithium metal under argon into a negative electrode chamber followed by the addition of liquid ammonia. The solution possessed an initial concentration of about 1.5M Li.

The tungsten dioxide lithium intercalating membrane was prepared by milling tungsten dioxide in an alumina ball mill using methylene chloride as a grinding aid to achieve an average tungsten dioxide particle size of about two to three microns. At this stage, 5$^w$/o Teflon was introduced to the WO$_2$ powder as an aqueous Teflon 30B mixture and thoroughly mixed. Water was removed by heating at about 100° C. in the atmosphere. Pellets of about 1 to 2 mm thickness were obtained after pressing at about 20,000 psi. Sintering of Teflon particles within the pressed composites was achieved by heating at 225° C. under argon for about 2 hours. Current collection directly from the WO$_2$ membrane was accomplished by attachment of a nichrome wire to one edge of the WO$_2$ membrane using graphoxy cement. The graphoxy cement was cured by heating the overall membrane assembly at 180° C. under argon for one hour. The negative electrode current collector assembly was then electronically insulated to protect it from any direct contact later to the solvated electron solution using Chemgrip epoxy adhesive for Teflon treated surfaces. The insulating epoxy was cured by heating the membrane assembly under argon at 100° C. for 30 minutes. Lithium intercalation was achieved by cathodically depositing lithium under constant current conditions at 0.1 mA/cm$^2$ onto the WO$_2$ membrane. Alternatively, lithium intercalation was achieved by direct chemical intercalation of the WO$_2$ membrane by immersion in a solvated electron lithium solution.

The non-aqueous solvent propylene carbonate and the supporting electrolyte LiCF$_3$SO$_3$ comprised the liquid non-aqueous lithium ion conducting electrolyte having the approximate stoichiometry 0.4MLiCF$_3$SO$_3$,PC. The solid lithium intercalation TiS$_2$ positive electrode was prepared containing 25$^w$/o Teflon/graphite mixture (in a 2:1 weight ratio). An intimate mixture of graphite (325 mesh) and Teflon (as an aqueous Teflon 30B mixture) was initially formed and water was removed by heating for several hours at 90° C. in the atmosphere. This composite was sintered at 250° C. for 2 hours under argon to cure the Teflon. This material was ground and mixed with TiS$_2$ to achieve the desired stoichiometry using acetonitrile as a mixing agent to make a fine paste. Acetonitrile was removed by heating at 60° C. in the atmosphere for 30 min. Pellets were formed by pressing at 20,000 psi. Current collection to the TiS$_2$ electrode was achieved either by inserting a coiled nichrome wire into the bulk of the powder mixture prior to pressing, or attaching a nichrome wire directly after pressing using graphoxy cement.

A cell having the following overall configuration was thus assembled:

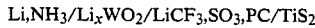

Li,NH$_3$/Li$_x$WO$_2$/LiCF$_3$,SO$_3$,PC/TiS$_2$

The cell, possessing a WO$_2$ membrane initially electrochemically intercalated with lithium at 0.1 mA/cm$^2$ to the stoichiometry Li$_{0.5}$WO$_2$, had an open circuit potential of 2.5 V and delivered a current density of 0.5 mA/cm$^2$ at 1.7 V under ambient pressure conditions. There was no observable deterioration upon extended cell cycling. It is expected that cells having a similar configuration but operating under pressure will be electrochemically cycled at current densities up to 100 mA/cm$^2$.

EXAMPLE II

A cell of the general type shown in Fig. 2 was assembled comprising a solvated electron lithium electrode with a tungsten dioxide lithium intercalation membrane and liquid lithium ion conducting positive electroactive material. The solvated electron lithium electrode was prepared as in Example I. The positive electroactive material comprised the supporting electrolyte LiCF$_3$SO$_3$ dissolved in acetonitrile solvent with the dissolved metal halide CuCl$_2$ in SO$_2$ liquid depolarizing agent. A graphitized carbon current collector was provided in the positive electrode compartment and was prepared containing 10 $^w$/o Teflon initially introduced as Teflon 30B followed by curing at 220° C. for several hours.

For the following cell, current densities of about 0.4mA/cm$^2$ could be realized at a cell voltage of 2.25 V:

Li,NH$_3$/Li$_{0.35}$WO$_2$0.2MLiCF$_3$SO$_3$0.1MCuCl$_2$ in 70 $^w$/o SO$_2$, 30 $^w$/o CH$_3$CN/C

The cell was found to readily accept a charge current and be completely electrochemically reversible. The following cell configuration had an initial open circuit potential of 3.44 V, the cell giving a current density of about 0.4mA/cm$^2$ at 2.4 V:

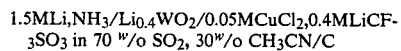

1.5MLi,NH$_3$/Li$_{0.4}$WO$_2$/0.05MCuCl$_2$,0.4MLiCF$_3$SO$_3$ in 70 $^w$/o SO$_2$, 30$^w$/o CH$_3$CN/C

This cell was completely electrochemically reversible. Cell life was limited by evaporative losses of both NH$_3$ and SO$_2$ under the ambient pressure conditions utilized in the cells.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A solvated electron lithium negative electrode comprising: containment means holding a solution of lithium dissolved in in liquid ammonia to form a solvated electron solution, said solvated electron solution contacting a lithium intercalating membrane and providing lithium to said lithium intercalating membrane during discharge and accepting lithium from said lithium intercalating membrane during charge.

2. A solvated electron lithium negative electrode according to claim 1 wherein the concentration of said lithium in said liquid ammonia is about 0.1M to about 7.75M.

3. A solvated electron lithium negative electrode according to claim 1 wherein the concentration of said lithium in said liquid ammonia is about 1.0M to about 3.5M.

4. A solvated electron lithium negative electrode according to claim 1 wherein said lithium intercalating membrane comprises a rutile metal oxide.

5. A solvated electron lithium negative electrode according to claim 1 wherein said lithium intercalating membrane is selected from the group consisting of: MoO$_2$, RuO$_2$, WO$_2$, OsO$_2$, IrO$_2$ and Mo$_{\frac{1}{2}}$V$_{\frac{1}{2}}$O$_2$.

6. A solvated electron lithium negative electrode according to claim 1 additionally comprising a current collector in contact with said solution.

7. A solvated electron lithium negative electrode according to claim 1 wherein said solution of lithium dissolved in liquid ammonia is pressurized at about 3 to about 8 atmospheres.

8. A solvated electron lithium negative electrode according to claim 1 wherein said lithium intercalating membrane is about 0.1 to about 4 mm thick.

9. A solvated electron lithium negative electrode according to claim 1 wherein said lithium intercalating membrane is about 1.5 to about 2.5 mm thick.

10. In a rechargeable high energy density lithium-based cell of the type having a negative electrode and a positive electrode each contacting a lithium ion conducting electrolyte, the improvement comprising: said negative electrode comprising containment means holding a solution of lithium dissolved in liquid ammonia to form a solvated electron solution, a portion of said containment means being a lithium intercalating membrane, said lithium intercalating membrane contacting said solvated electron solution on one side and said electrolyte on the opposite side, said solvated electron solution providing lithium to said lithium intercalating membrane during discharge and accepting lithium from said lithium intercalating membrane during charge of said cell.

* * * * *